(12) United States Patent
Chalozin et al.

(10) Patent No.: US 9,723,335 B2
(45) Date of Patent: *Aug. 1, 2017

(54) SERVING OBJECTS TO BE INSERTED TO VIDEOS AND TRACKING USAGE STATISTICS THEREOF

(71) Applicant: INNOVID INC., New York, NY (US)

(72) Inventors: Tal Chalozin, New York, NY (US); Izhak Zvi Netter, Brooklyn, NY (US)

(73) Assignee: INNOVID INC., New York, NY (US)

( * ) Notice: Subject to any disclaimer, the term of this patent is extended or adjusted under 35 U.S.C. 154(b) by 28 days.

This patent is subject to a terminal disclaimer.

(21) Appl. No.: 14/287,247

(22) Filed: May 27, 2014

(65) Prior Publication Data

US 2014/0282724 A1 Sep. 18, 2014

Related U.S. Application Data

(62) Division of application No. 12/867,075, filed as application No. PCT/IL2009/000167 on Feb. 12, 2009, now Pat. No. 8,745,657.

(Continued)

(51) Int. Cl.
*H04N 21/234* (2011.01)
*H04N 21/431* (2011.01)
(Continued)

(52) U.S. Cl.
CPC ..... *H04N 21/23418* (2013.01); *G06T 19/006* (2013.01); *H04N 5/2723* (2013.01); *H04N 21/235* (2013.01); *H04N 21/239* (2013.01); *H04N 21/2353* (2013.01); *H04N 21/24* (2013.01); *H04N 21/25* (2013.01); *H04N 21/251* (2013.01); *H04N 21/252* (2013.01); *H04N 21/258* (2013.01); *H04N 21/25825* (2013.01); *H04N 21/25883* (2013.01); *H04N 21/2668* (2013.01); *H04N 21/43* (2013.01); *H04N 21/431* (2013.01); *H04N 21/435* (2013.01); *H04N 21/4312* (2013.01); *H04N 21/4314* (2013.01); *H04N 21/4316* (2013.01);
(Continued)

(58) Field of Classification Search
None
See application file for complete search history.

(56) References Cited

U.S. PATENT DOCUMENTS

| 7,979,877 B2 * | 7/2011 | Huber | G06Q 30/02 725/32 |
| 2002/0073167 A1 * | 6/2002 | Powell | H04L 12/5692 709/217 |

(Continued)

*Primary Examiner* — Justin Shepard
(74) *Attorney, Agent, or Firm* — Koffsky Schwalb LLC; Mark I. Koffsky

(57) ABSTRACT

Enriching video-based content with additional content is enabled by defining metadata for a video comprising a place holder and matching attribute. When the video is viewed, a matching server is utilized to select an object to be inserted in the place holder according to the matching attribute. The matching server selects the object according to video content, represented by matching attribute, according to user related information, and according to type of place holder. The place holder may be utilized to dynamically insert an interactive object to the video. The inserted object may be seamlessly inserted to the video.

17 Claims, 6 Drawing Sheets

Related U.S. Application Data

(60) Provisional application No. 61/065,703, filed on Feb. 13, 2008.

(51) Int. Cl.
| | | |
|---|---|---|
| *H04N 21/442* | (2011.01) | |
| *H04N 21/24* | (2011.01) | |
| *H04N 21/435* | (2011.01) | |
| *H04N 21/44* | (2011.01) | |
| *H04N 21/25* | (2011.01) | |
| *H04N 21/258* | (2011.01) | |
| *H04N 21/43* | (2011.01) | |
| *G06T 19/00* | (2011.01) | |
| *H04N 5/272* | (2006.01) | |
| *H04N 21/235* | (2011.01) | |
| *H04N 21/45* | (2011.01) | |
| *H04N 21/4725* | (2011.01) | |
| *H04N 21/84* | (2011.01) | |
| *H04N 21/858* | (2011.01) | |
| *H04N 21/239* | (2011.01) | |
| *H04N 21/2668* | (2011.01) | |
| *H04N 21/81* | (2011.01) | |

(52) U.S. Cl.
CPC ..... *H04N 21/4318* (2013.01); *H04N 21/4355* (2013.01); *H04N 21/4356* (2013.01); *H04N 21/4358* (2013.01); *H04N 21/44* (2013.01); *H04N 21/442* (2013.01); *H04N 21/44012* (2013.01); *H04N 21/44213* (2013.01); *H04N 21/4524* (2013.01); *H04N 21/4725* (2013.01); *H04N 21/812* (2013.01); *H04N 21/84* (2013.01); *H04N 21/8586* (2013.01)

(56) References Cited

U.S. PATENT DOCUMENTS

| | | | | |
|---|---|---|---|---|
| 2003/0018966 | A1* | 1/2003 | Cook | H04N 7/165 725/2 |
| 2004/0119848 | A1* | 6/2004 | Buehler | G06K 9/00771 348/239 |
| 2006/0117356 | A1* | 6/2006 | Jojic | G06F 17/30811 725/88 |
| 2009/0083147 | A1* | 3/2009 | Paila | G06Q 30/0273 705/14.69 |
| 2009/0094555 | A1* | 4/2009 | Viitala | H04M 1/72544 715/838 |

* cited by examiner

SERVING OBJECTS TO BE INSERTED TO VIDEOS AND TRACKING USAGE STATISTICS THEREOF

CROSS-REFERENCE TO RELATED APPLICATIONS

The present application is a divisional of U.S. Ser. No. 12/867,075 filed on Aug. 11, 2010 the disclosure of which is incorporated herein by reference. U.S. Ser. No. 12/867,075 claims priority of the filing date of provisional patent application Ser. No. 61/065,703 titled In-video advertising real estate, filed Feb. 13, 2008, the contents of which is incorporated herein by reference.

BACKGROUND OF THE INVENTION

Field of the Invention

The present disclosure relates to video content distribution in general, and to insertion of an additional object to a video content, in particular.

Description of Related Art

Ever since the Internet has enabled people all around the world to communicate with each other, entrepreneurs have tried to use the Internet as a media for broadcasting content suited for their needs. One specific example is by introducing advertising content in websites. Such advertising content allows companies to monetize the traffic of their sites. Examples of online advertising content include contextual ads (such as Google AdWords), banner ads and the like. However, in the modern Internet environment, when many users are connected to the Internet through broadband connections such as ADSL and cable, and many more people are expected to be so connected in the future, the content delivered through the Internet is changing from textual and image based content to video based content. For example, in recent years broadcasting websites such as YouTube (http://www.youtube.com) have emerged and they attract many users. Specifically, YouTube is considered one of the most viewed websites in the world today. Such broadcasting websites enable any user—amateur or professional—to share his content with other users. Such content may be viewed by million viewers and more, and hence may constitute a suitable platform for advertisement. Additional video content sent over the Internet includes premium content, online television shows, semi-professional video content, online educational content, video conferences, video content captured by web cameras and the like.

However, advertisement models have not evolved to be suitable to the new web. Current advertisement models for a video-based content primarily focus on adding intrusive elements to the video, such as a pre/post roll and ticker banners. Such intrusive advertisements are not welcomed by users which find the ads harm their viewer experience. For example, YouTube have reported that over 75% of their users are unhappy with pre/post rolls. The matching process of matching an advertisement to a video remains similar to the matching done in contextual advertisements—by identifying relevant words within the website, and without directly addressing the content of the video.

In view of the foregoing, there is a need for a new technology to enable a better insertion of additional content, such as advertising content, to a video-based content, to increase the attraction of such commercial content. This is a long felt need to enable enrichment of video-based content with additional content.

BRIEF SUMMARY OF THE INVENTION

One object of the subject matter is to disclose a computerized apparatus comprising an interface for receiving video data of a captured video; the video data comprises a set of one or more frames; an interface for receiving indication of a region within the video data; and a place holder creator module for determining a place holder within the video data; the place holder is determined based on the indication of a region; the place holder is configured to enable an insertion of an object from a set of objects to the video data; the place holder is further configured to enable the insertion such that the object is consistent with an environment of the video data.

Optionally, the video data comprises more than one frame.

Optionally, the indication of the region is in a key frame; and the place holder creator module determines the place holder in a set of frames comprising at least the key frame and another frame.

Optionally, the computerized apparatus further comprises a tracking module for computing tracking data; the tracking data comprises tracking an area within a frame of the video data; the place holder creator module determines the place holder according to the tracking data.

Optionally, the place holder creator module determines the place holder according to a camera-position change.

Optionally, the place holder creator module utilizes a portion of the indication of the first region for background subtraction.

Optionally, the computerized apparatus further comprises an interface to define a matching attribute for to the place holder.

Optionally, the computerized apparatus is operationally coupled to a storage device for storing data relating to the place holder.

Another object of the subject matter is to disclose a computerized apparatus comprising: an interface for receiving video metadata associated with a video data of a captured video; the video data comprises a set of one or more frames; the video metadata comprises a place holder and a matching attribute; the matching attribute is associated with the place holder; an interface to an object database comprising at least one object; a matching module for selecting an object from the object database according to the video metadata; the object is designated to be inserted to a portion of the place holder.

Optionally, the place holder is configured to enable an insertion of the object to a portion of the place holder; the place holder is further configured to enable the insertion such that the object is consistent with an environment of the video data.

Optionally, the object is configured to be inserted into more than one video.

Optionally, the video metadata comprises an additional place holder.

Optionally, the matching attribute is not associated with the additional place holder.

Optionally, the place holder defines a first region in a frame of the video data; and the additional place holder defines a second region in the frame.

Optionally, the object is an interactive object.

Optionally, the computerized apparatus further comprises an interface for sending the object to a computerized client.

Optionally, the computerized apparatus further comprises the computerized client; the computerized client is configured to display the video data and the object.

Optionally, the matching module comprises: a client information module for receiving client information regarding the computerized client; and a client-aware object matching module for selecting the object from the object database according to the video metadata and the client information.

Optionally, the client information comprises demographic information regarding a user of the computerized client.

It is yet another object of the subject matter to disclose a computer program product embodied on one or more computer-usable medium for performing a computer process comprising: a first computer-readable program code for receiving video metadata associated with a video data of a captured video; the video metadata comprises a place holder and a matching attribute associated with the place holder; a second computer-readable program code for selecting an object from an object database according to the video metadata; the object is configured to be inserted into more than one video; the object is further designated to be inserted to a portion of the place holder.

Optionally, the object is an interactive object.

Optionally, the computer program product further comprises: a third computer-readable program code for sending the object to a client; the client is configured to display the video data and the object; and wherein the second computer-readable program code comprises: a fourth computer-readable program code for receiving client information regarding the client; and a fifth computer-readable program code for selecting the object from the object database according to the video metadata and the client information.

It is yet another object of the subject matter to disclose a computerized system comprising: an interface for receiving video data of a captured video; the video data comprises a set of one or more frames; an input device for receiving input from a first user; a metadata creator module for determining video metadata associated with the video data; the video metadata comprises: a place holder defining a region within a portion of the set of one or more frames; the region is based on input received by the input device; a match attribute associated with the place holder; a metadata server for storing the video metadata; a computerized server for sending the video data to a computerized client; an object database; and a matching server for selecting an object from the object database according to the place holder, the match attribute and the computerized client.

Optionally, the computerized client displays the captured video and the selected object to a second user; the selected object is displayed according to the place holder.

BRIEF DESCRIPTION OF THE DRAWINGS

The present invention will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

A technical problem dealt by the subject matter is to enable enrichment of content into a video-based content. Another technical problem dealt by the subject matter is to aggregate the additional content and improve a viewer experience of a viewer receiving the aggregated content. Yet additional technical problem dealt by the subject matter is to dynamically aggregate content in addition to a video-based content.

One technical solution is to provide a video metadata creator to determine a place holder within a video-based content; the place holder indicates a region in one or more frames of a video, in which an object may be inserted when the video is viewed by a user. The object may be selected from an object server comprising general-purpose objects which may be inserted to many types of content.

Another technical solution is to provide a matching module to match a video with an object for one or more place holders. The matching module determines the object in respect to a matching attribute and/or user information, such as demographical information of the user viewing the content.

Yet another technical solution is to create a place holder such that an object may be seamlessly inserted to the video. By providing tracking information, such as 3D mesh information, camera tracking information and the like, the object may be modified in accordance with changes occurring in the video. Some exemplary non-limiting changes include camera position change, cut-scene, blocking obstacle, illumination change and the like.

One technical effect of the disclosed subject matter is a runtime association, or matching, between an object and a video. Another technical effect of the disclosed subject matter is aggregating object over a finished video, such as a post-production video. Yet another technical effect of the disclosed subject matter is enabling the display of an object within a video, as if the object is part of the video.

Figure 1:
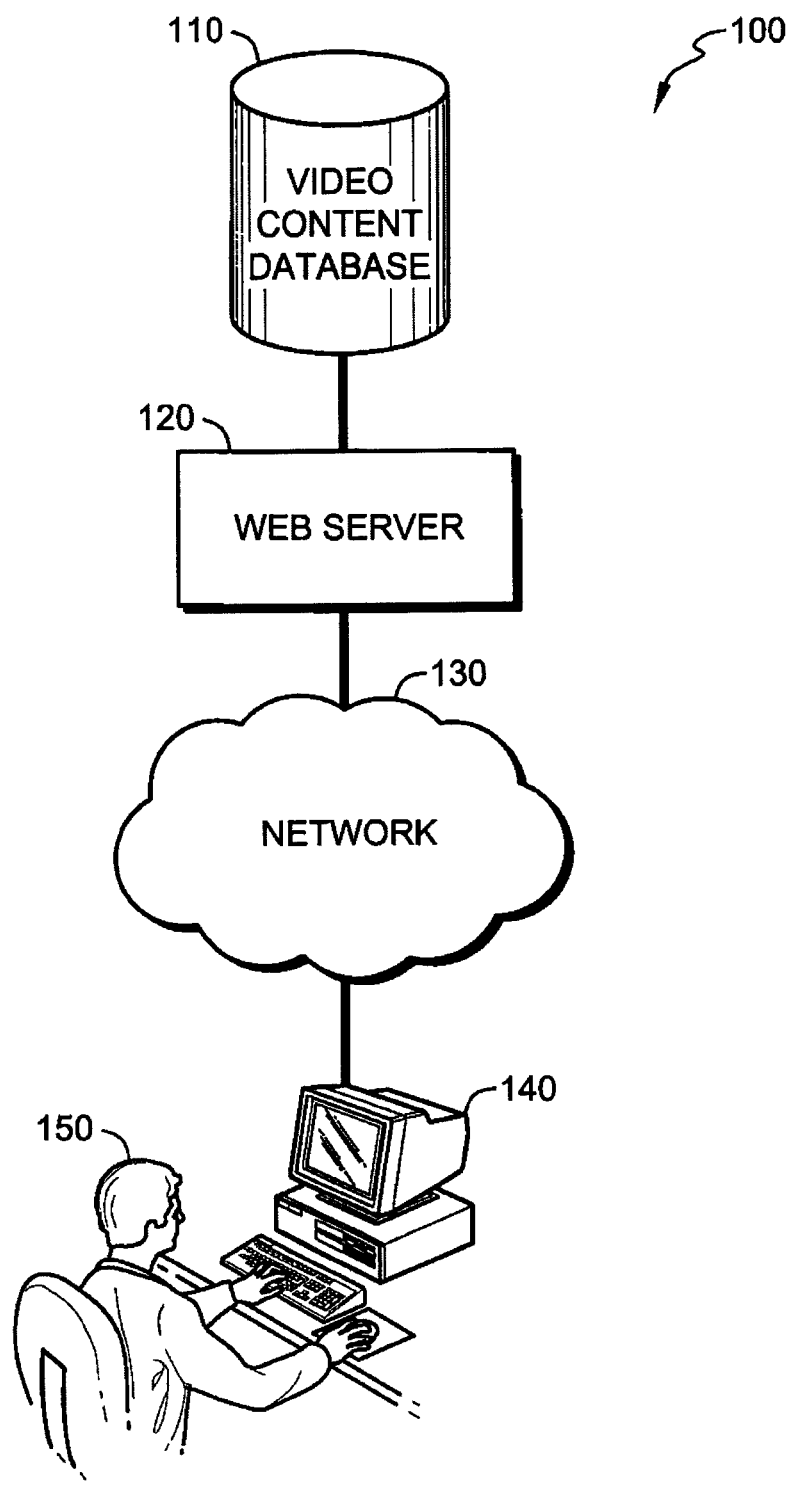
FIG. 1 shows a diagram of an environment in which the disclosed method and apparatus may be implemented and used, in accordance with some exemplary embodiments of the disclosed subject matter.

FIG. 1 shows a diagram of an environment 100 in which the disclosed method and apparatus may be implemented and used, in accordance with some exemplary embodiments of the disclosed subject matter. The environment 100 comprises a computerized web server 120 operatly coupled to a video content database 110, a computerized network 130, a client computer 140 and a user 150 operating the client computer 140. The web server 120 may be any computerized apparatus that is able to serve requests for sending content, such as but not limited to a dedicated or non-dedicated computerized server, a personal computer, a personal digital assistant, a mobile phone running a web server application, IPTV server and the like. In some exemplary embodiments, the web server 120 is a Content Delivery Network (CDN). The web server 120, in response to receiving a content request, may access the video content database 110 and send a request and receive a video content (not shown). The web server 120 may further send the video content over the computerized network 130 to the client computer 140. The user 150 may view the video content. It will be noted that in the present disclosure, hearing, feeling, smelling, tasting, touching or otherwise sensing are also considered as viewing the video content. The client computer 140 may be any type of a computerized apparatus enabling the user 150 to view a video content such as dedicated or non-dedicated computerized server, a personal computer, a personal digital assistant, a mobile phone, IPTV client, video streamer, set-top box and the like. The video content database 110 may be comprised within the web server 120 or in another computerized apparatus such as a database server. The video content database 110 may further be connected to the web server 120 through the computerized network 130, another network (not shown) or a direct connection.

In some exemplary embodiments, in response to receiving the video content by the client computer 140, the client computer 140 displays the video content to the user 150 and additionally displays an object in a predetermined location within the video content. The object may be received from a computerized matching server (not shown), an object database (not shown) and the like. A computerized matching server is a computerized server configured to select an object to be viewable when a video content is viewed. In some exemplary embodiments, the client computer 140 may comprise the object database.

The computerized network 130 may be the Internet, intranet, WAN, LAN, WiFi network and any other network where data or information is passed there through. Hereinafter, a video may be a series of frames with or without an associated soundtrack, a Flash animation, an animated GIF and the like. The video may comprise one or more frames. A frame may be associated to audio information such as a sound, or other information that may be sensed by a user. The video may be compiled using a codec, such as MPEG codec, DivX codec and the like. The video may be transmitted over the computerized network 130 in a streaming or non-streaming manner.

Unless otherwise indicated, the video has been compiled without intrusion related to the disclosed subject matter. For example, no specific hardware was used to create the video and no tracking information inserted to the video while being created (such as using a tracking device during filming). Although the disclosed subject matter may be improved by providing such intrusion, it is not required in order for the disclosed subject matter to be utilized over a video. This to emphasize that the video may be any video uploaded to a broadcasting website, video publisher site and the like. A video data refers to a data describing a video such as a Flash video file, AVI video file, DivX codec video, animated gif and the like. Video data may be streamed, downloaded or otherwise transferred.

Figure 2:
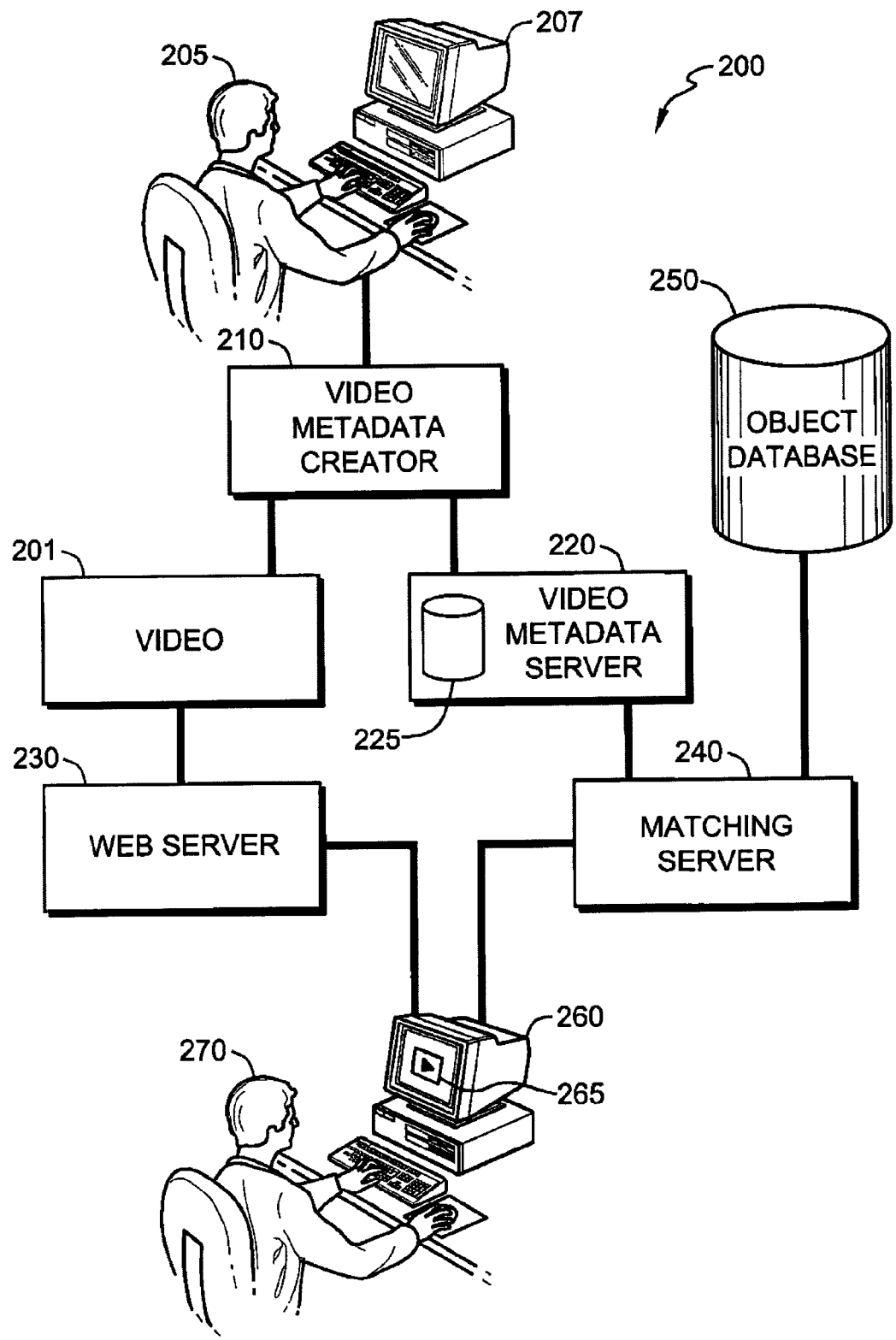
FIG. 2 shows a diagram of an environment enabling to enrich a video by adding an object, in accordance with some exemplary embodiments of the disclosed subject matter.

FIG. 2 shows a diagram of an environment 200 enabling to enrich a video by adding an object, in accordance with some exemplary embodiments of the disclosed subject matter. The environment 200 comprises a video metadata creator 210, a computerized matching server 240, a computerized web server 230, such as web server 120 of FIG. 1, a client computer 260, such as client computer 140 of FIG. 1 and a user 270, such as user 150 of FIG. 1. The video metadata creator 210 may be a computerized apparatus which enables a developer 205 to create video metadata (not shown) relating to a video 201. Video metadata refers hereinafter to data describing a video, such as the video 201, or said video content or any other aspect or characteristic of said video or relating to said video and the like. Video metadata may comprise matching attribute. Matching attribute, as described in more detail below, may comprise but is not limited to information regarding lighting, shadowing and the like, information regarding objects in the video 201 such as a person, an animal and the like, keywords relevant to the content of the video 201 and the like. Video metadata may further comprise a place holder for defining a region within one or more frames to be used to insert an object to the video. The place holder may comprise tracking information such as a reference matrix as described below and the like. The place holder may be used for inserting the object in a seamless manner. A seamless insertion refers to an insertion of an object to a video such that the video appears as part of the original content, by at least providing that the object is consistent with the environment of the original content. For example, a seamless insertion of an object, such as a bottle, may require the bottle's image to be modified to adjust to a change of perspective in the video due to camera position change. Seamless insertion requires the inserted object to appear as part of the environment of the video 201 in terms of perspective, shadowing, lighting, z-ordering or occluding to be consistent with blocking obstacles and the like. However, it will be noted that the seamlessly inserted object may appear to stand out from the environment of the video 201 in order to inform a user viewing the video 201 that an interaction with the inserted object is possible. In some exemplary embodiments, the seamlessly inserted object is displayed with a bubble such as a click-me bubble or other call for interaction bubble, with a product overlay distinguishing the seamlessly inserted object from the environment by, for example, modifying its color or other displayable attributes, with highlighted outline and with other similar means.

"the place holder is configured to enable an insertion of an object from a set of objects to the video data; the place holder is further configured to enable the insertion such that the object is consistent with an environment of the video data".

In some exemplary embodiments, the video metadata creator 210 is a software product operated by a terminal 207. In other exemplary embodiments, the video metadata creator 210 may be a computerized server. The developer 205 may indicate a location in the video in which an object may be inserted. Such an indication is passed to the video metadata creator 210 using the terminal 207 or other man-machine interface. For example, in case the video 201 shows a room, the developer 205 may indicate a region positioned over a portion of a wall of the room in which an object may be inserted. The region may be of a predetermined size, a predetermined two dimensional or three dimensional shapes such as polygon, ellipse or cube, a predetermined proportion which may be scaled and the like. The video metadata creator 210 may use the aforementioned indication to create a place holder in one or more frames. For example, a place holder may be created in an entire scene showing the room; until the next cut-scene; until a predetermined frame; from the last cut-scene; until a predetermined change in ambiance (such as romantic, thrilling and the like); until or from other predetermined characteristic that applies or can be applied to the video 201 and the like. In some exemplary embodiments, a place holder has a predetermined shape such as a sphere, a chest, a ball, a circle and the like. In other exemplary embodiments, an object inserted in a place holder may be of the predetermined shape exactly, a scaled version of the predetermined shape or otherwise a manipulated version of the predetermined shape. The developer 205 may further indicate an obstacle that blocks the view to the place holder. The video metadata creator 210 may determine a place holder in more than one frame according to an indication of a region in a single frame, referred to as a key frame. In some exemplary embodiments, one or more key frames may be used to indicate one or more regions to be utilized in determining a place holder. In some exemplary embodiments, the video metadata creator 210 may create more than one place holder for a video. In an exemplary embodiment of the disclosed subject matter, a first place holder and a second place holder are defined for a video. A portion of the first and second place holders may be defined in one or more frames, such that if objects are inserted to the place holders, the two object may appear in the frame, at the same time.

In some exemplary embodiments, the video metadata creator 210 further receives a matching attribute (not shown) from the developer 205 to define which object may be inserted to the place holder. A matching attribute may comprise keywords describing a frame or audio associated there to, ambiance information, information of type of video (music video, television show, sport and the like), information of type of object to be inserted in the place holder (such as a 3D object, a 2D object, a small object, an object relating to cooking and the like) and similar information. In yet other exemplary embodiments, the video metadata creator 210 may determine a matching attribute using a computer vision algorithm such as face recognition, optical character recognition, gesture recognition, product or other object detection and the like. The video metadata creator 210 may further determine a matching attribute using other computerized algorithms inspecting the video, such as inspecting the soundtrack for specific audio bits or for certain modifications in the soundtrack, speech detection and the like.

In some exemplary embodiments, a matching attribute may be associated with a place holder. In other exemplary embodiments, a matching attribute may be associated with a portion of the video 201. A matching attribute associated with a portion of the video 201 may be utilized in determining a set of frames that comprise a place holder. As described above, a place holder may be placed in accordance to an indication in a key frame, and the video metadata creator 210 may determine one or more additional frames to comprise the place holder according to the matching attribute. For example, the place holder may be comprised in every frame of the video 201 that has romantic ambiance, or may be comprised in every frame after the key frame until a frame for which a specific matching attribute, such as a keyword, is relevant. It will be noted that in an exemplary embodiment of the disclosed subject matter, a matching attribute may be relevant to a first portion of the video 201 and not to a second portion of the video 201.

The video metadata creator 210 may store the place holder and/or the matching attribute in a database 225 which may be comprised within a video metadata server 220. In some exemplary embodiments of the disclosed subject matter, storing a place holder refers to storing a positional reference within each frame that comprises the place holder. In additional exemplary embodiments, a reference matrix may be stored to enable computations of modifications of an object inserted to the place holder. For example, in case a 3D environment appears in the video, such as a room, and a perspective in a first frame differs from the perspective in a second frame, an object inserted in a first frame may require modifications to appear as part of the 3D environment. An object such as a bottle may be required to be turned to its side to appear within the 3D environment to meet with the new perspective. Exemplary perspective modification may be caused due to changing of a camera position. The second frame may be a frame after the first frame, such as a sequential frame. The second frame may further be a frame before the first frame. The reference matrix may later be used for a computation of modification of objects inserted to the place holder. Modifications may be in an X, Y or Z axis such as rotating, translating, rolling, pitching, yawing and the like. The reference matrix may be computed using tracking information, such as computed using tracking algorithms such as natural feature tracking and optical flow. In some exemplary embodiments, the reference matrix may further comprise opaque related information, shadowing related information and the like. The reference matrix may comprise any information for later modifying a given object as required to seamlessly insert the given object to the video 201. For example, the reference matrix may comprise a representation, such as coefficient representation, of a linear transformation that may be applied on an object in order to match to a perspective of the video 201. In an exemplary video, a perspective of a first frame of the video 201 is modified to turn to the left in a second frame of the video 201. An object that is inserted to the first frame require a modification, such as a transformation, when inserted to the second frame in order to appear embedded within an environment of the video 201. The transformation may require an adjustment of the image of the object in order to be in line with the modified perspective of the second frame. The transformation may be performed using linear transformations that define or otherwise describe the difference between the first and second perspectives.

In some exemplary embodiments of the disclosed subject matter, several place holders may be grouped together to allow two or more objects to be inserted to the video such that they relate to one another. For example, two billboard place holder may be place in opposite walls in a room such that when matched with objects, two related billboards may be placed, such as the famous "Mr. PC and Mr. Mac" advertisement campaign of Apple. Other exemplary grouped objects may be a billboard and a 3D object, such as mobile phone, that interact with each other, such as by pressing or hovering over the 3D object, the billboard discloses information regarding the 3D object. In an exemplary embodiment, a first object is a hot spot and a second object is an overlay widget. In response to an interaction of a user with the hot spot, the overlay widget is displayed. The overlay widget is displayed in one place holder, while the hot spot is displayed, or located without being displayed, in a second place holder. Some exemplary user interactions may be pointing, clicking, hovering and the like. In an exemplary embodiment, the overlay widget discloses information regarding the hot spot, such as in case the hot spot is located over a telephone, the overlay widget may comprise an advertisement to a communication company, to the telephone device and the like.

In response to a request by the client computer 260, the web server 230 may deliver the video 201 to the client computer 260. Also, upon such request, the matching server 240 may be requested to match an object to the video 201. The matching server 240 may retrieve video metadata from a video metadata server 220 comprising the database 225 for storing the video metadata. The matching server 240 may match an object from an object database 250 according to parameters, rules or characteristics. The matching may take into account the video metadata of the video 201, object characteristics, user 270 demographic information, such as geographical location, age, viewing history and the like, information regarding the client computer 260 such as operating system, network resources available and the like, usage statistics of an object and the like. A video player 265 in the client computer 260 may display the video 201 with one or more objects matched by the matching server 240. Each object may be inserted to a place holder determined by the client computer 260, by the matching server 240 and the like. It will be noted that an object inserted to a place holder may occupy a portion of the place holder, for example by being inserted in only a portion of the frames in which the place holder is defined, or by being displayed in only a portion of the region defined by the place holder. In some exemplary embodiments of the disclosed subject matter, the video player 265 may be a specialized video player, a standard video player such as Flash-based video player, java-based video player and the like, that utilizes an extension to enable displaying the one or more objects with the video 201.

The video player 265 may utilize a rendering matrix to display the object within a 3D environment in the video 201. In some exemplary embodiments of the disclosed subject matter, the web server 230 may receive the object from the matching server 240, compile an aggregated content comprising the video 201 and the object, and send the aggregated content to the client computer 260. In some exemplary embodiments of the disclosed subject matter, the object is an interactive object. In other exemplary embodiments, the object is seamlessly inserted to the video. In yet other exemplary embodiments, the object is presented in an overlay on top of the video. For example, an interactive ticker being displayed over a video. In additional exemplary embodiments, the object is a hot spot on top of the video 201 and may be displayed only upon predetermined interaction such as clicking, point and the like. In further additional exemplary embodiments, the object is overlayed on top of the video 201 in addition to other overlayed layers. Additional layers, such as shadowing layer representing shadow cast by the object, may be further overlayed. In other exemplary embodiments, an alpha channel may be applied to a layer to modify the layer. The alpha channel modification may be used to occlude a portion of the layer that a view to it is blocked due to, for example, an obstructing object. The alpha channel modification may further be used to determine opaque level of a portion of the layer. Additional modification to a layer may represent shadowing, emphasizing elements and the like.

In other exemplary embodiments, z-order may be determined by the place holder to which an object is inserted, by the matching server 240, by the client computer 260, by the web server 230 and the like, to determine the layering of several objects and content of the video such as foreground or background.

In some exemplary embodiments of the disclosed subject matter, the video player 265 tracks usage statistics relevant for an object. For example, a period of time for which the object was displayed, a number of times the user 270 interacted with the object, a number of times a predetermined behavior of the object was performed and the like. The video player 265 may send to the matching server 240.

It will be noted that the web server 230, the client computer 260, the video metadata server 220, the object database 250, the matching server 240, the video metadata creator 210 and the terminal 207 may be connected to one another or to a portion thereof using a communication network such network 130 of FIG. 1.

Figure 3:
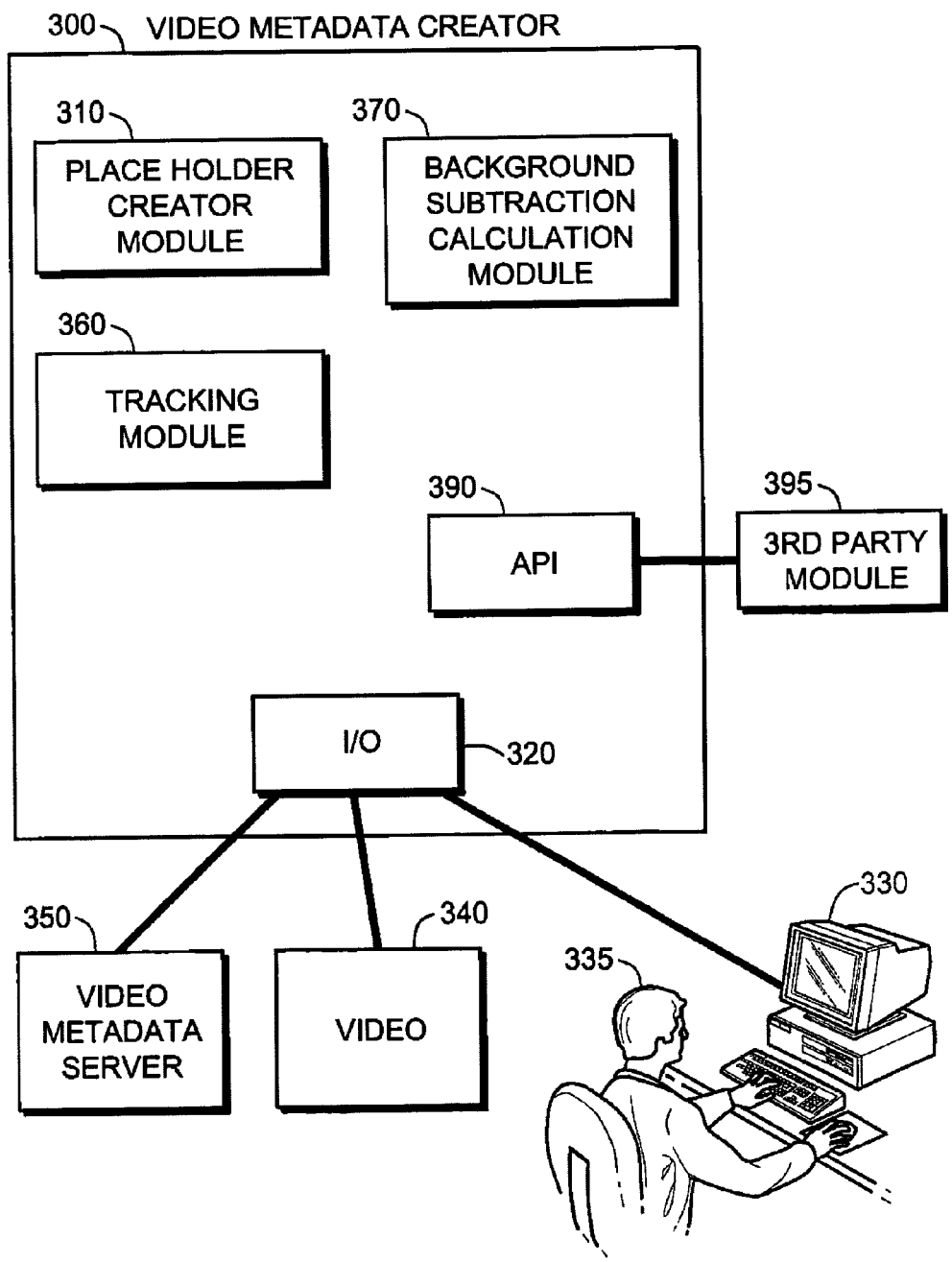
FIG. 3 shows a diagram of a video metadata creator, in accordance with some exemplary embodiments of the disclosed subject matter.

FIG. 3 shows a diagram of a video metadata creator, in accordance with some exemplary embodiments of the disclosed subject matter. A video metadata creator 300, such as 210 of FIG. 2, may be utilized to create video metadata for a video 340, such as 201 of FIG. 2. The video metadata creator 300 may comprise an I/O device 320 and a place holder creator module 310. The I/O device 320 may provide an interface to a developer 335, such as 205 of FIG. 2. The developer 335 may be a programmer, advertising personal, an owner of a video or any other person desiring to indicate a place holder in a video. The developer 335 may use a man-machine interface 330, such as 207 of FIG. 2, to provide input for, and/or view output of, the video metadata creator 300. The I/O device 320 may further provide an interface to receive the video 340 or data representing the video 340. The I/O device 320 may further provide an interface to a video metadata server 350, such as 220 of FIG. 2. The video metadata server 350 may be used to store video metadata created by the video metadata creator 300. In some exemplary embodiments, the video metadata server 350 is a database, such as SQL server, MySQL, Oracle database and the like. It will be noted that in some exemplary embodiments, video metadata creator 300 comprises the video metadata server 350 and in other exemplary embodiments, the video metadata server 350 is separate from the video metadata creator 300.

The place holder creator module 310 may receive an input from the developer 335 indicating a key frame. The place holder creator module 310 may further receive an input from the developer 335 indicating a region to place a place holder within the key frame. In some exemplary embodiments, the developer 335 may designate a place holder to be replaced by a 3D or 2D object in a seamless manner.

A tracking module 360 may be utilized to track changes between a perspective in the key frame to a perspective in another frame. The tracking module 360 may be utilized to determine a reference matrix or otherwise compile relevant information to be used when inserting an object to a place holder. The developer 335 may indicate to the place holder creator module 310 to group several regions as a single place holder. The developer 335 may indicate to the place holder creator module 310 that a specific segment of the video comprises a place holder. In some exemplary embodiments, the place holder creator module 310 may create more than one place holder in a video. In some exemplary embodiments, the developer 335 may indicate a matching attribute to be associated with a place holder. The place holder creator module 310 may provide said association automatically. In other exemplary embodiments, a matching attribute may be associated with a portion of the video 340, either automatically by the place holder creator module 310 or based on an indication from the developer 335.

A background subtraction calculation module 370 may be utilized to determine obstacles blocking view to a place holder. The background subtraction calculation module 370 may receive input from the developer 335 or automatically determine a background and a foreground or otherwise automatically calculate information relevant for background subtraction. In an exemplary embodiment of the disclosed subject matter, the background subtraction calculation module 370 calculates information regarding background subtraction of a foreground blocking a view to an object, such that only an unblocked portion the object will be displayed. It will be noted that other algorithms and techniques may be utilized to determine an unblocked portion of the object for display.

An Application Programming Interface (API) 390 may provide an interface to a 3rd party module 395. The API 390 may enable the developer 335 to use the 3rd party module 395 to determine additional video metadata such as a matching attribute, a place holder and the like. The 3rd party module may provide additional tracking, masking and similar capabilities useful for creating video metadata. For example, in some exemplary embodiments of the disclosed subject matter, the video metadata creator 300 may utilize the 3rd party module 395 to provide for background subtraction calculation instead of using the background subtraction calculation module 370.

Figure 4:
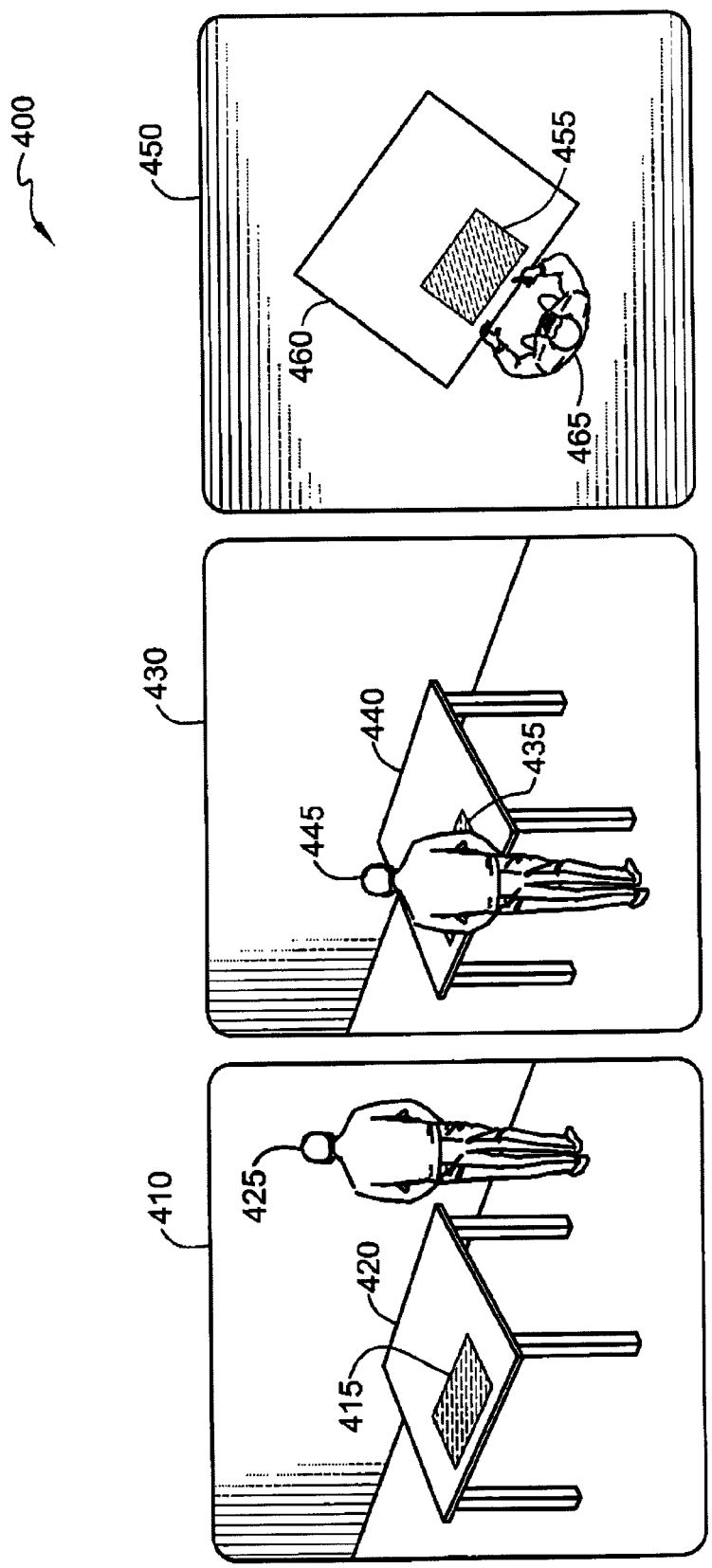
FIG. 4 shows an exemplary video, in accordance with some exemplary embodiments of the disclosed subject matter.

FIG. 4 shows an exemplary video, in accordance with some exemplary embodiments of the disclosed subject matter. A video 400 comprises three frames showing a person and a table. A first frame 410 comprises a person 425 and a table 420. A second frame 430 comprises a person 445 and a table 440. A third frame 450 comprises a person 465 and table 460. Persons 425, 445 and 465 are a single person being shown in several frames. Tables 420, 440 and 460 are a single table being shown in several frames. A first frame 410 may be determined to be a key frame. Such determination may be done in accordance with an input from a developer. The developer may further indicate that a first region 415 in the key frame 410 may be used to insert an object. According to the first region 415 in the key frame 410, the disclosed subject matter may determine a similar region in the second frame 430 and the third frame 450. A second region 435 in the second frame 430 is behind the person 445. A background subtraction or an equivalent algorithm may be applied to enable insertion of an object to appear behind the person 445 in the second frame 430. A perspective in the third frame 450 is different than a perspective in the key frame 410. A change in a camera position, either by changing a camera or by moving, shifting or otherwise adjusting a camera, may be a cause to the difference between the two perspectives. A third region 455 may be calculated in accordance with the first region 415 and the perspective difference between the key frame 410 and the third frame 450.

Figure 5:
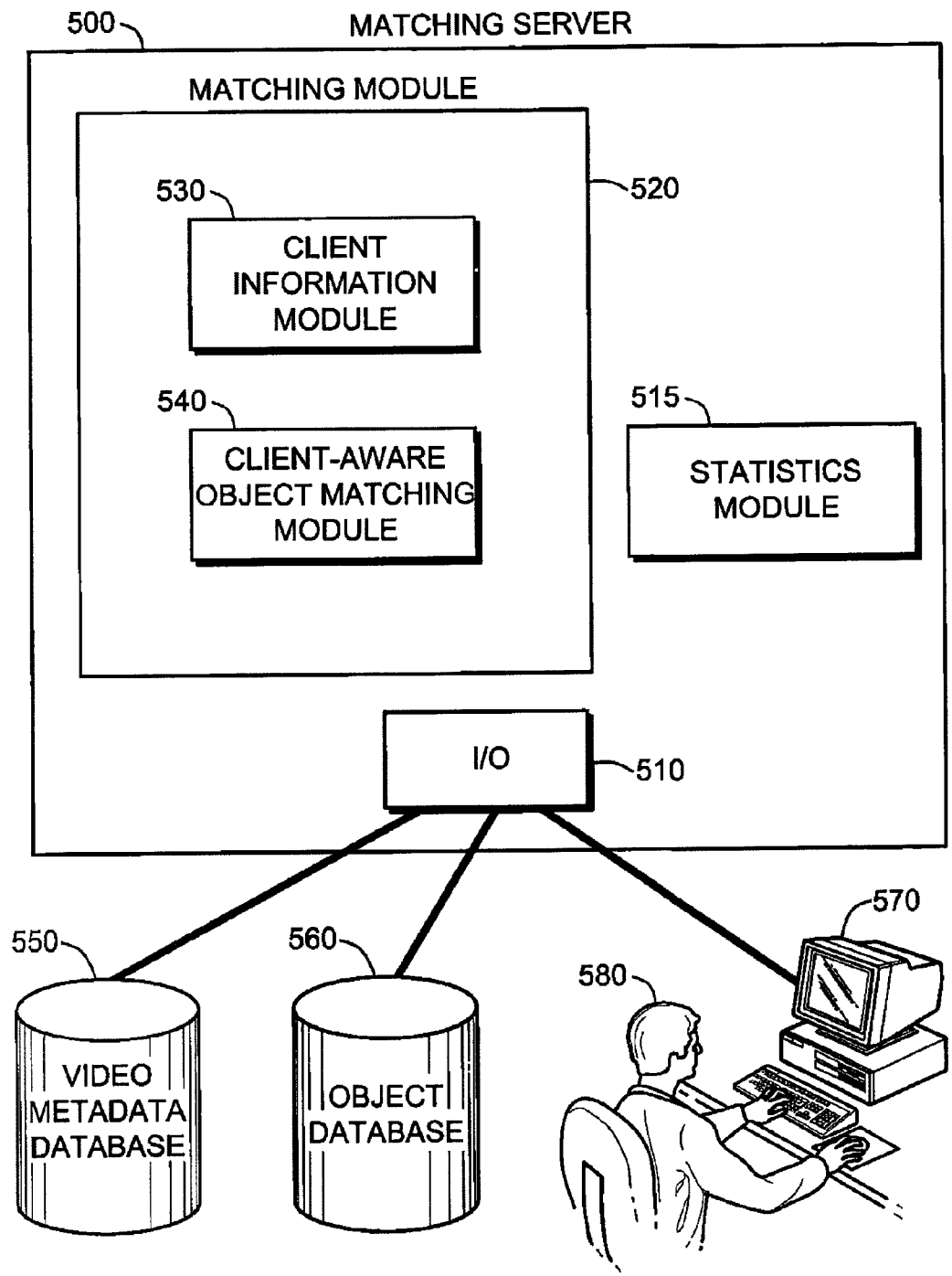
FIG. 5 shows a diagram of a matching server, in accordance with some exemplary embodiments of the disclosed subject matter.

FIG. 5 shows a diagram of a matching server, in accordance with some exemplary embodiments of the disclosed subject matter. A matching server 500, such as 240 of FIG. 2, may comprise a matching module 520 and an I/O device 510. The I/O device 510 may provide an interface to a video metadata database 550, such as 225 of FIG. 2, and to an object database 560, such as 250 of FIG. 2. The I/O device 510 may further provide an interface to a client computer 570, such as 260 of FIG. 2, used by a user 580, such as 270 of FIG. 2. The matching module 520 may match an object from the object database 560 with a place holder defined by a video metadata in the video metadata database 550. The video metadata may be associated with a video that will be displayed to the user 580. The matching module 520 may match the object to the place holder in accordance to a matching attribute such as type of content in video, type of content to be inserted to video, ambiance information, keywords and the like. It will be noted that different objects should be presented to different users. For example, an object used by an ad targeting United States of America residences should be displayed mainly to users located in the United States of America. Ads may target different demographic sections, such as age, income and the like.

In some exemplary embodiments, the matching server 500 further comprises a statistics module 515. The statistics module 515 gathers statistical information regarding an object, such as number of times the object was matched, number of times the object was displayed by a client computer 570, period of time the object was displayed, number of times the user 580 has interacted or responded to the object and the like. The matching module 520 may utilize the statistics gathered by the statistics module 515 to determine an object to match to a video, based on past matching performed. For example, it may be desirable to match an object that previous users interacted with. In some exemplary embodiments, the user 580 may provide a feedback as for the relevancy of the object to the video or otherwise indicate whether the matching was successful. In other exemplary embodiments, an object may have a cap to the number of times to be displayed. For example, an owner of the object may provide such a cap to limit a cost of an advertisement campaign.

The matching module 520 may comprise a client information module 530 and a client-aware object matching module 540. The client information module 530 retrieves, receives or otherwise obtains information regarding the user 580 or the client computer 570. Exemplary client information is demographic information, location, age, viewing history, resources available to the client computer 570, technological limitations of the client computer 570, installed software and the like. It will be noted that client information may further comprise any information relevant for advertising, promoting, targeting and the like. The client information may be utilized by the client-aware object matching module 540 to match an object with a place holder. In some exemplary embodiments, an object is matched with a place holder using a portion of all aforementioned information. In other exemplary embodiments, a place holder is matched to all objects meeting matching attributes, and an object is selected from possible objects in accordance to the client information. Upon matching, the matching server 500 may send the matched object to the client computer 570 to be displayed. In some additional exemplary embodiments, the place holder defines a type of object that may be displayed or otherwise inserted to it. For example, an object of a predetermined shape, size, proportion or any other characteristic of the object.

Figure 6:
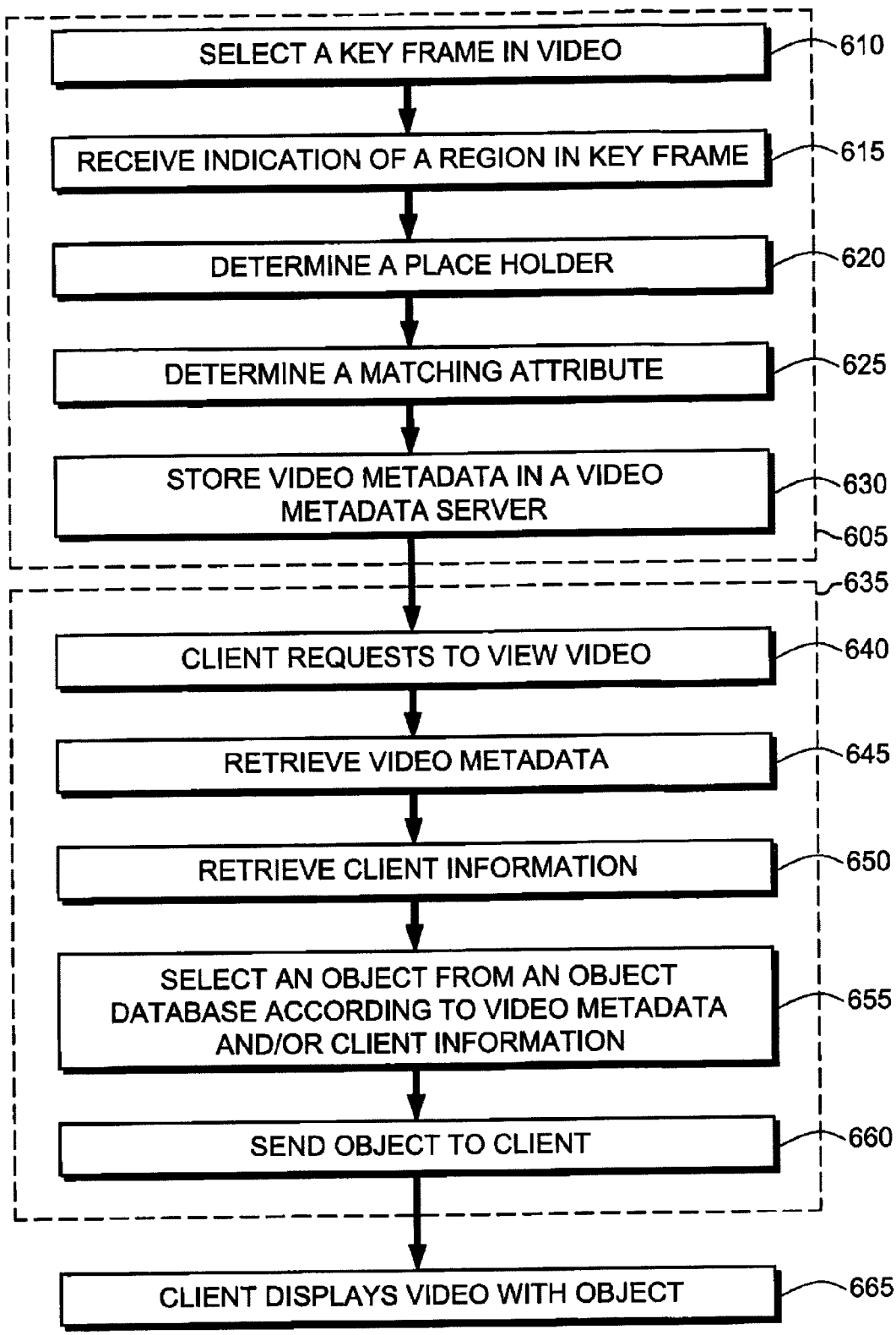
FIG. 6 shows a flow diagram of a method for matching an object with a video, in accordance with some exemplary embodiments of the disclosed subject matter.

FIG. 6 shows a flow diagram of a method for matching an object with a video, in accordance with some exemplary embodiments of the disclosed subject matter.

In step 605, a video metadata is created and stored, by, for example, a video metadata creator, such as 210 of FIG. 2. Step 605 comprises of steps 610, 615, 620, 625 and 630.

In step 610, a key frame is selected in the video. In an exemplary embodiment, a developer selects or otherwise indicates a key frame using an interface.

In step 615, an indication of a region in the key frame is received. In an exemplary embodiment, the indication is given by a developer.

In step 620, a place holder is determined. The place holder may be determined in accordance with the indication given in step 615. The indication may comprise information regarding a location and a shape of the place holder. The indication may further comprise information regarding blocking obstacles that should be displayed in front of the place holder. The indication may additionally comprise information regarding shadowing, opaque level and the like, related to an object being inserted in the place holder. Also, the indication may comprise a direct or indirect selection of a set of frames to comprise the place holder. For example, the set of frames may be selected by the developer directly, or may be selected by providing a characteristic defining it such as until cut-scene, from cut-scene, until ambiance change, until a predetermined keyword does not describe a frame and the like.

In step 625, a matching attribute for the place holder is determined. The matching attribute may be determined manually by a developer or automatically by predetermined rules applied to the video, parameters or characteristics of the video and the like.

In step 630, a video metadata comprising the place holder and the matching attribute is stored in a video metadata server such as 220 of FIG. 2. In some exemplary embodiments, the video metadata further comprises reference matrix and other information used for displaying or modifying the display of an object.

In step 635 the video metadata is utilized to match an object with a video, such that the object may be displayed in the video by the client computer, in step 665. Step 635 may be performed by, for example, a matching server such as 240 of FIG. 2. Step 635 comprises steps 640, 645, 650, 655 and 660.

Upon request from a client computer to view a specific content in step 640, the video metadata is retrieved in step 645. In some exemplary embodiments, the client computer displays the video using a video player. The video player may comprise an extension to enable display of and/or interaction with an inserted object. The video player extension may initiate a matching request to the matching server when a request from the client computer to view a video is identified. In other exemplary embodiments, a computerized web server, such as 230 of FIG. 2, acting as a distributor of the video, initiates a matching operation upon request from the client to view the video.

In step 650, client information is retrieved, for example by the client information module 530 of FIG. 5.

In step 655, a selection is made of an object from an object database, such as 250 of FIG. 2. The selection may be made in accordance to a place holder, a matching attribute, client information and the like.

In step 660, the selected object, also referred to as matched object, is sent to the client. In some exemplary embodiments, the matched object is sent by the computerized web server to the client computer in addition to the video. In such a case, the client computer renders the matched object into the video, for example by using overlays of matched objects, z-ordering the objects, masking in accordance to blocking obstacles (occluding) and the like.

The client computer may display the video with the rendered matched object in step 665. In other exemplary embodiments, the matched object may be rendered into the video by the computerized web server and a compiled video comprising the rendered matched object may be sent to the client computer in step 660. In such a case, the client computer displays the video sent to him in step 665.

According to a preferred embodiment of the disclosed subject matter, the matched object is streamed to the client computer from a matching server. The video is streamed to the client computer from a computerized web server. The client computer renders the matched object to the video and displays it as the information is streamed to it. The client computer further enables interactive behavior of the matched object such as reacting to pointing device, clicking or otherwise interacting with it. The matched object may further interact with third-party content such as RSS feeds, video and the like.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

A person skilled in the art will appreciate that there exist multiple embodiments and variations exist which follow the guidelines of the disclosed methods and apparatus. Multiple implementations may exist for determining connections between categories or key-phrases, based on multiple factors, and expressed as a multiplicity of formulae. There may also exist numerous representation options which demonstrate the connections and the connections' intensity.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation, material, step of component to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A computerized system comprising a processor, wherein the computerized system further comprising:
    an interface for receiving video metadata associated with a video data of a captured video; the video data comprises a set of one or more frames; the video metadata comprises a place holder and a matching attribute; the matching attribute is associated with the place holder, the place holder is associated with a reference matrix for the place holder, wherein the reference matrix is computed based on tracking information, wherein the reference matrix enables modification computations of objects inserted to the place holder;
    an interface to an object database comprising at least one object;
    a statistics module configured for gathering statistical information based on previous responses by plurality of users to the at least one object being inserted into the place holder, wherein the statistical information is information regarding the relevancy of the at least one object to the video data and the place holder;
    a background subtraction calculation module for determining one or more obstacles blocking view to the place holder according to the video metadata; and
    a matching module for selecting an object from the object database according to the video metadata and the statistical information; the object is designated to be modified according to the reference matrix and be inserted to a portion of the place holder in accordance to the one or more obstacles that are blocking a view of the place holder in the video data, wherein the one or more obstacles are not modified and are displayed in front of the object, whereby the one or more obstacles are blocking a view of the object.

2. The computerized system of claim 1, wherein the place holder is configured to enable an insertion of the object to a portion of the place holder; the place holder is further configured to enable the insertion such that the object is consistent with an environment of the video data.

3. The computerized system of claim 1, wherein the video metadata comprises an additional place holder.

4. The computerized system of claim 1, wherein the object is an interactive object.

5. The computerized system of claim 4, wherein the statistical information comprises information on user interaction with the object based on interactions by a plurality of users.

6. The computerized system of claim 1 further comprising an interface for sending the object to a computerized client.

7. The computerized system of claim 6, wherein the computerized client is configured to display the video data and the object.

8. The computerized system of claim 7, wherein the matching module comprises:
    a client information module for receiving client information regarding the computerized client; and
    a client-aware object matching module for selecting the object from the object database according to the video metadata and the client information.

9. The computerized system of claim 8, wherein the client information comprises demographic information regarding a user of the computerized client.

10. A method performed by a processor, the method comprising:
    obtaining video metadata of a video to be displayed to a user via a user device, wherein the user device is enabled to inject an interactive object to the video while the video is being displayed to the user, and wherein the video metadata comprises background subtraction information regarding obstacles blocking view to a place holder of the video;
    obtaining statistical information regarding interaction of users with objects that can be injected into the place holder within the video and the relevancy of each of the objects to the video and the place holder, wherein the objects are interactive objects that are retained in an object database;
    matching an object from the objects to the video based on the video metadata and the statistical information, wherein the object is designated to be injected to the video; and
    transmitting the object to the user device, whereby enabling the user device to dynamically inject the object to the video, wherein the dynamic injection comprises rendering the object with masking operation in accordance to one or more blocking obstacles that are blocking a view of the place holder in the video, wherein the one or more obstacles are not modified and are displayed in front of the object, whereby the one or more obstacles are blocking a view of the object, wherein said rendering further comprises modifying the object based on a computation using a reference matrix, wherein the reference matrix is computed for the place holder based on tracking information associated with the video.

11. The method of claim 10, wherein said matching is performed so as to take into account user interactions by a plurality of users, with the object which resulted from past matching of the objects with the video.

12. The method of claim 10 further comprising:
    receiving, from the user device, usage information regarding usage of the object, wherein the usage information comprises one or more information items selected from the group consisting of: a period of time during which the object was displayed, a number of interactions the user performed with the object while the object was displayed, and a number of times a predetermined behavior of the object was performed; and
    updating the statistical information based on the received usage information.

13. A method performed by a user device, the method comprising:

receiving a video to be displayed to a user, wherein the video comprising a place holder;

receiving an object from a matching server, wherein the object is designated to be injected to the video in the place holder, wherein the object is selected by the matching server based on information comprising usage statistics gathered based on user interactions in response to past insertions of objects into the place holder within the video;

rendering the object into the place holder in the video, the place holder is associated with a reference matrix for the place holder, wherein the reference matrix is computed based on tracking information of the video, wherein said rendering comprises masking the object in accordance to one or more blocking obstacles that are blocking a view of the place holder in the video, wherein the one or more blocking obstacles are determined by background subtraction calculations, wherein the one or more obstacles are not modified and are displayed in front of the object, whereby the one or more obstacles are blocking a view of the object, wherein said rendering further comprises modifying the object based on a computation using the reference matrix;

displaying the video with the rendered object;

tracking the usage statistics of the object;

sending the usage statistics to the matching server.

14. The method of claim 13, wherein the object is an interactive object.

15. The method of claim 13, wherein the object selection by the matching server is performed so as to take into account the relevancy of the object to the video.

16. The method of claim 13, wherein the object selection by the matching server is performed so as to take into account user interaction with the object which resulted from past matching of the objects with the video.

17. The method of claim 13, wherein the usage statistics comprises one or more information items selected from the group consisting of: a period of time during which the object was displayed, a number of interactions the user performed with the object while the object was displayed, and a number of times a predetermined behavior of the object was performed.

* * * * *